US012806925B2

(12) United States Patent
Rosales et al.

(10) Patent No.: US 12,806,925 B2
(45) Date of Patent: Nov. 24, 2026

(54) MEDIA CARTRIDGE WITH SINGLE COMPONENT CORE LOCKING MECHANISM

(71) Applicant: Zebra Technologies Corporation, Lincolnshire, IL (US)

(72) Inventors: Angel B. Rosales, Port Hueneme, CA (US); Steve Ting Kei Chow, Monterey Park, CA (US)

(73) Assignee: Zebra Technologies Corporation, Lincolnshire, IL (US)

(*) Notice: Subject to any disclaimer, the term of this patent is extended or adjusted under 35 U.S.C. 154(b) by 187 days.

(21) Appl. No.: 18/941,139

(22) Filed: Nov. 8, 2024

(65) Prior Publication Data

US 2026/0131584 A1 May 14, 2026

(51) Int. Cl.
*B41J 15/04* (2006.01)

(52) U.S. Cl.
CPC .................................. *B41J 15/044* (2013.01)

(58) Field of Classification Search
CPC ........... B41J 15/044; B41J 15/04; B41J 15/00
See application file for complete search history.

(56) References Cited

U.S. PATENT DOCUMENTS

| | | | | |
|---|---|---|---|---|
| 2013/0264408 A1* | 10/2013 | Maekubo | ............ | B60R 22/3413 242/379.1 |
| 2017/0291571 A1* | 10/2017 | Takamatsu | .......... | B60R 22/3413 |
| 2018/0297553 A1* | 10/2018 | Takamatsu | ............ | B60R 22/405 |
| 2019/0092276 A1* | 3/2019 | Takamatsu | ............ | B60R 22/405 |

* cited by examiner

*Primary Examiner* — David H Banh

(57) ABSTRACT

An example disclosed herein includes a media cartridge. The media cartridge includes a housing, including a spindle having a hollow cylindrical profile and a slot; a media roll including a roll core, including a plurality of internal teeth disposed about an internal circumference of the roll core, and a web of media; and a media stop component including a body, a peg extending from the body, a first biasing member configured to bias the peg towards a surface of the housing, an arm extending from the body, the arm comprising at least an external tooth, a second biasing member configured to bias the arm, wherein media stop component is integrally formed.

17 Claims, 12 Drawing Sheets

MEDIA CARTRIDGE WITH SINGLE COMPONENT CORE LOCKING MECHANISM

BACKGROUND

Media processing devices, namely printers or other systems, can process media from a media cartridge. The media contained within the media cartridge can include wristbands, labels, receipt media, cards, and the like. When the media contained in the media cartridge is configured as a roll, or as a spool, controlling the rotation and output of the roll or spool may prevent the leading edge of the media from retracting into the media cartridge or unintentional dispense during shipping and handling of the media cartridge before it is installed in a media processing device and/or may reduce instances of media blockages and jams as the media is processed.

SUMMARY

Figure 1:
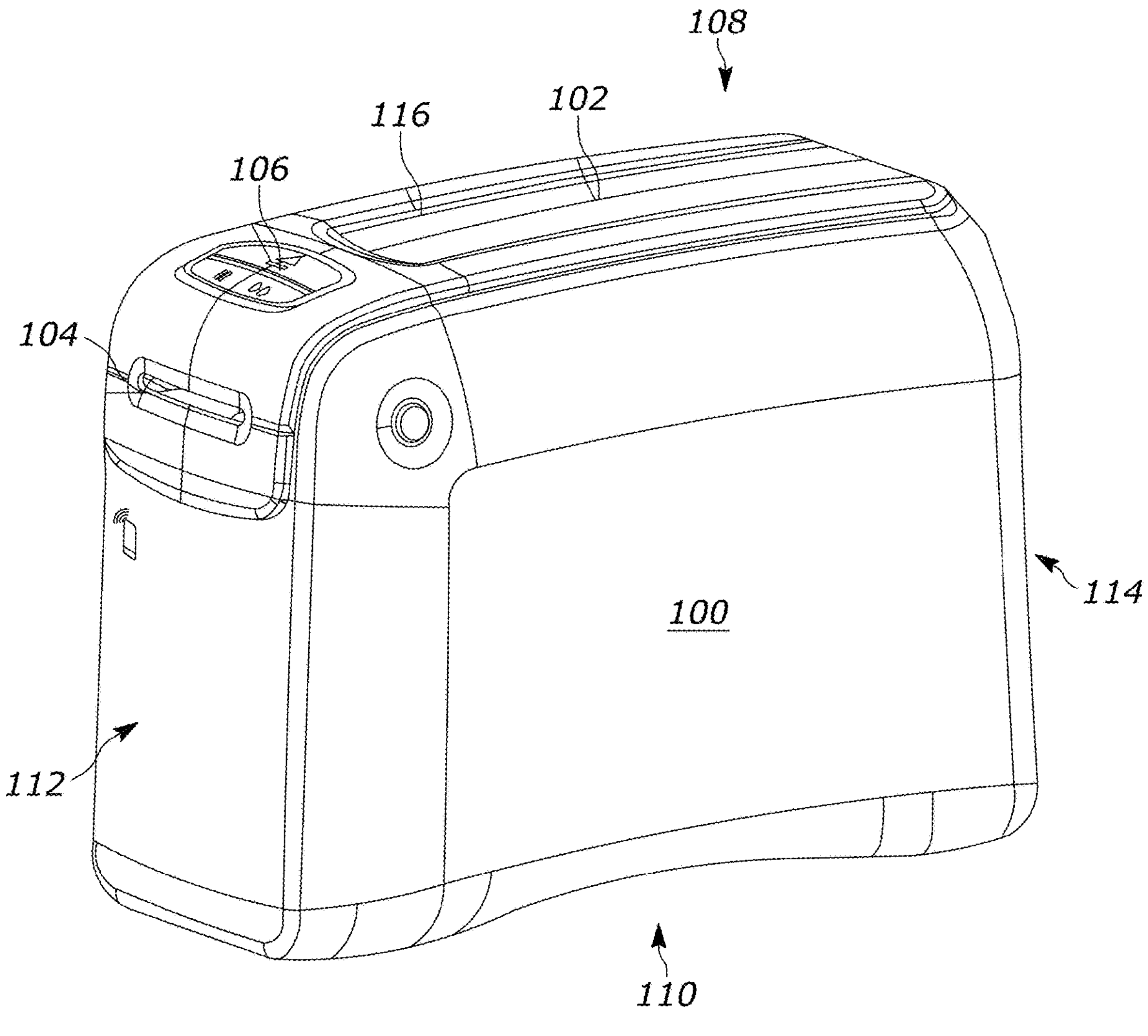
FIG. 1 illustrates a media processing device containing a media cartridge, according to embodiments of the present disclosure.

In an embodiment, the technology of the present disclosure is provided by a media cartridge including a housing, including a spindle a hollow cylindrical profile and a slot, a media roll configured to rotate about the spindle, the media roll including a roll core configured to rotate about the spindle and including a plurality of internal teeth disposed about an internal circumference of the roll core, and a web of media, wound about the roll core, and a media stop component, configured to rotate between a media hold position and a media release position, including a body, a peg extending from the body, a first biasing member configured to bias the peg towards a surface of the housing, an arm extending from the body, the arm configured to extend through the slot of the spindle and into the hollow cylindrical profile, the arm including at least an external tooth, a second biasing member configured to bias the arm such that the external tooth engages with the plurality of internal teeth of the roll core, and wherein, when the media stop component is in the media hold position, a) the web of media is pinched between the peg and the surface of the housing, and b) the external tooth is engaged with at least one of the plurality of internal teeth of the roll core, such that rotation of the media roll about the spindle is blocked, wherein when the media stop component is in the media release position, a) the body is configured to rotate against a bias of the first biasing member, such that the peg is separated from the surface of the housing and the web of media is movable between the peg and the surface of the housing, and b) the body is configured to rotate against a bias of the second biasing member, such that the arm rotates away from the plurality of internal teeth of the roll core to space the external tooth away from the plurality of internal teeth, and the media roll is rotatable about the spindle, and wherein media stop component is integrally formed.

In another aspect of the technology of the present disclosure, the media cartridge further includes a third biasing member, integrally formed with the body, the third biasing member configured to bias the body towards the media hold position.

In another aspect of the technology of the present disclosure, the media stop component rotates about an axis shared with the spindle.

In another aspect of the technology of the present disclosure, second biasing member biases the arm against a surface of the hollow cylindrical profile of the spindle.

In another aspect of the technology of the present disclosure, the arm includes a surface matched with an internal curved surface of the hollow cylindrical profile of the spindle.

In another aspect of the technology of the present disclosure, the web of media is included of media elements selected from a group consisting of labels, wristbands, RFID tags, printable media, and combinations thereof.

In another aspect of the technology of the present disclosure, a mating angle between one of the plurality of internal teeth and the external tooth is configured such that when a rotative force is applied to the media roll when the media stop component is in the media hold position, the external tooth is biased towards the roll core.

In another aspect of the technology of the present disclosure, each internal tooth of the plurality of internal teeth includes a first tooth face opposed to a second tooth face, the first tooth face defined in a first plane and the second tooth face defined in a second plane, such that the first plane and the second plane intersect at a point that is located at a greater distance from a radial center of the roll core than an internal circumference of the roll core.

In another aspect of the technology of the present disclosure, the plurality of internal teeth is configured such that a gap width of a gap between each pair of teeth of the plurality of internal teeth is at least 1.5 times a tooth width of the external tooth.

In another aspect of the technology of the present disclosure, the arm includes a plurality of external teeth, each external tooth of the plurality of external teeth configured to simultaneously engage with the plurality of internal teeth of the roll core when the media stop component is in the media hold position.

In another aspect of the technology of the present disclosure, the housing is formed by a first housing side and a second housing side, and the spindle is formed by a first spindle portion, integrally formed with the first housing side and a second spindle portion integrally formed with the second housing side, the slot formed in one of the first spindle portion and the second spindle portion.

In another aspect of the technology of the present disclosure, the media stop component is an injection molded plastic element.

In another aspect of the technology of the present disclosure, the media stop component is an additively manufactured plastic element.

In an embodiment, the technology of the present disclosure is provided by a media cartridge including a housing, including a spindle a hollow cylindrical profile and a slot, and a media stop component, configured to rotate between a media hold position and a media release position, including a body, a peg extending from the body, a first biasing member configured to bias the peg towards a surface of the housing, an arm extending from the body, the arm configured to extend through the slot of the spindle and into the hollow cylindrical profile, the arm including at least an external tooth, a second biasing member configured to bias the arm towards the slot, and wherein, when the media stop component is in the media hold position, a) the peg is pressed against the surface of the housing, and b) the external tooth protrudes from the spindle through the slot, wherein when the media stop component is in the media release position, a) the body is configured to rotate against a bias of the first biasing member, such that the peg is separated from the surface of the housing, and b) the body is configured to rotate against a bias of the second biasing member, such that the arm translates away from the slot and the external tooth is retracted into the spindle away from the slot, wherein media stop component is integrally formed.

In another aspect of the technology of the present disclosure, the media cartridge further includes a media roll including a roll core, the roll core configured to rotate about the spindle, including a plurality of internal teeth disposed about an internal circumference of the roll core, and a web of media, wound about the roll core, wherein when in the media hold position, the external tooth of the arm engages with the plurality of internal teeth of the roll core, blocking the media roll from rotating about the spindle, wherein, when in the media release position, the external tooth is disengaged from the plurality of internal teeth, such that the media roll is rotatable about the spindle.

In another aspect of the technology of the present disclosure, the media stop component is an injection molded plastic element.

In another aspect of the technology of the present disclosure, the media stop component is an additively manufactured plastic element.

DETAILED DESCRIPTION

Embodiments of the present disclosure now will be described more fully hereinafter with reference to the accompanying drawings, in which some, but not all embodiments of the disclosure are shown. Indeed, the embodiments of the present disclosure can have many different forms and should not be construed as limited to the embodiments set forth herein; rather, these embodiments are provided so that this disclosure will satisfy applicable legal requirements. Like numbers refer to like elements throughout.

Media processing devices require media to process in order to operate. The media may be provided by a variety of sources. One such media source may be provided to the media processing device as a media roll supported within a media cartridge (or cartridge). In some embodiments, a media cartridge is loaded into the media processing device such that the media contained within the media cartridge can be drawn out by the media processing device during operation. The use of media cartridges is advantageous as the cartridge is easily loaded into and removed within a media processing device by a user who does not have to be an expert in the field of media processing. Many different types of media may come in cartridges, including media labels of different lengths and widths or wristbands. Cartridges may be designed such that when the cartridge is installed it automatically feeds media from the cartridge to the media processing device for processing.

When the media is installed in the media cartridges (e.g., during manufacturing), a leading terminal end of the media is threaded through media guides to an outlet of the media cartridges. During shipping and handling of the media cartridges it is possible for the media to retract into the media cartridge and/or for the media roll to unwind. To prevent the leading edge of the media from inadvertently retracting into the media cartridge and/or to prevent the media roll from inadvertently unwinding, the media cartridge can include one or more locking structures that hold the leading edge of the media in place at the media outlet and prevent the media roll from unwinding until the media cartridge is installed in a media processing device at which time the media processing device can control the media.

FIG. 1 depicts a media processing device 100 (otherwise referred to herein as "printer"). While the illustrated embodiments and description provided herein are directed primarily to a printing device, other media processing devices such as media encoders, label applicators, or laminators, may benefit from the mechanisms described. The depicted embodiment is of a direct thermal printer, however one skilled in the art would appreciate that other types of thermal printers, such as thermal transfer printers, may be used.

The media processing device 100 is configured to receive a cartridge 102 within a slot 116. The slot 116 may be located on a top side 108 of the media processing device 100, where the cartridge 102 may be entered, and pushed down into place by a user. The media processing device 100 configuration as depicted in FIG. 1 is occasionally referred to as a "toaster" type printer. In some embodiments, the cartridge 102 may contains a roll of labels to process, and in other embodiments the cartridge 102 may include wristbands, RFID tags, thermally printable media, or any other type of media that can be printed and coded or in which indicia can be applied. The media processing device 100 further includes an output 104, the output 104 being disposed on a front side of the media processing device 100. The front side 112 of the printer is opposite a rear side 114 of the media processing device 100 and the media processing device 100 further includes a bottom side 110 of the media processing device 100. The top side 108 and the bottom side 110 of the media processing device 100 are relative to a possible surface that the media processing device 100 might rest on during operation.

As depicted in FIG. 1, the output 104 of the media processing device 100 is configured to allow media to exit the media processing device 100 after processing. As will be discussed further below, the output 104 is configured to align with a media output of the cartridge 102 such that media exiting the cartridge 102 for processing can be processed and immediately expelled from the media processing device 100. The media processing device 100 may also feature inputs 106, depicted in FIG. 1 as buttons. The inputs 106 allow the user to control elements of the print operation to dispel additional media, pause processing, skip a current processing operation, or other processing operations known in the art.

Figure 2:
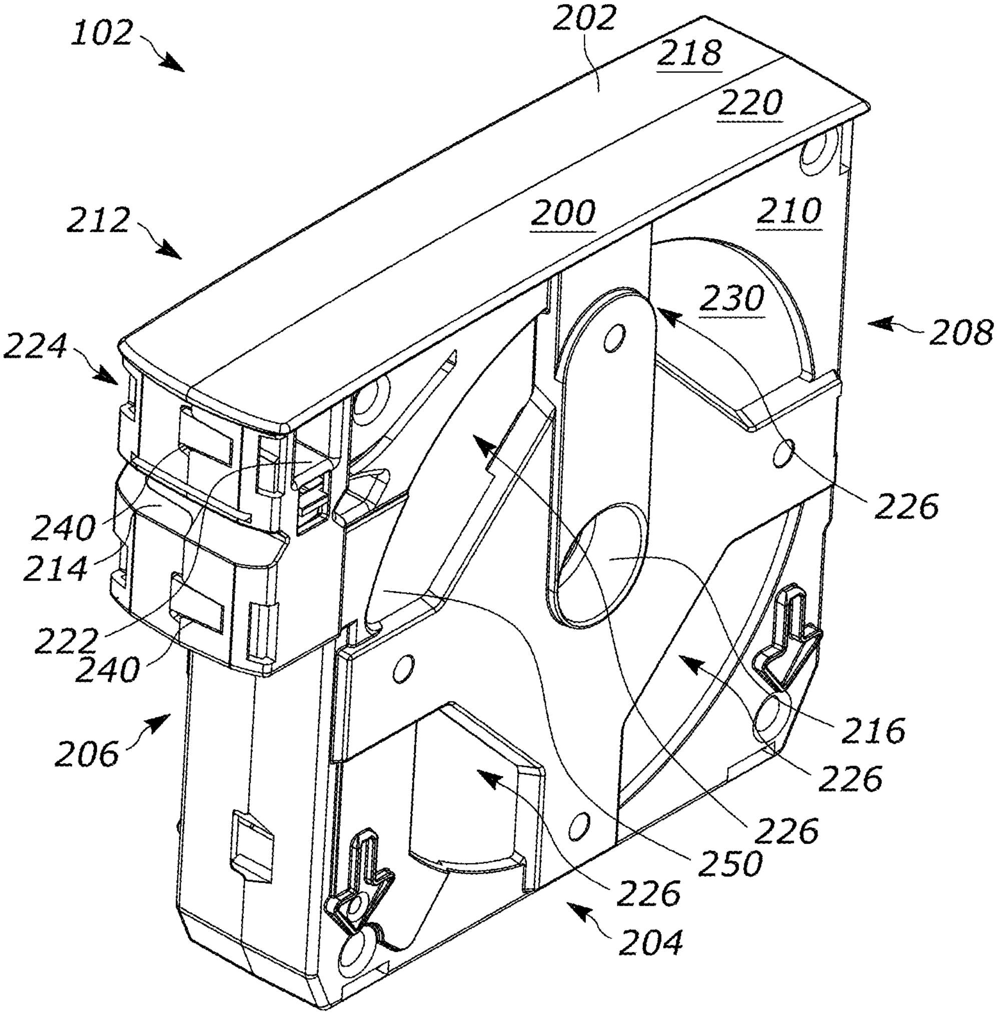
FIG. 2 illustrates a perspective view of an example media cartridge, according to embodiments of the present disclosure.
Figure 3A:
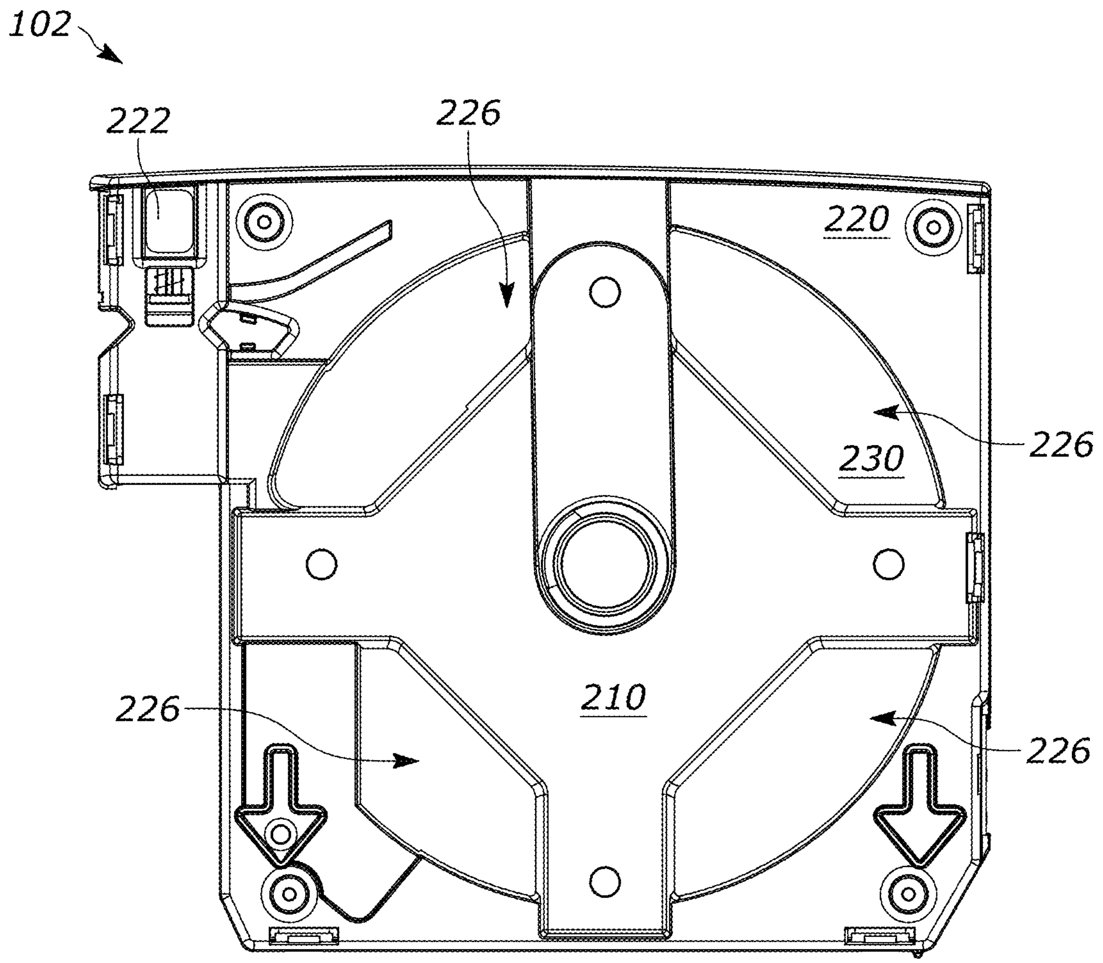
FIGS. 3A-3B illustrate profile views of the media cartridge of FIG. 2, according to embodiments of the present disclosure.
Figure 3B:
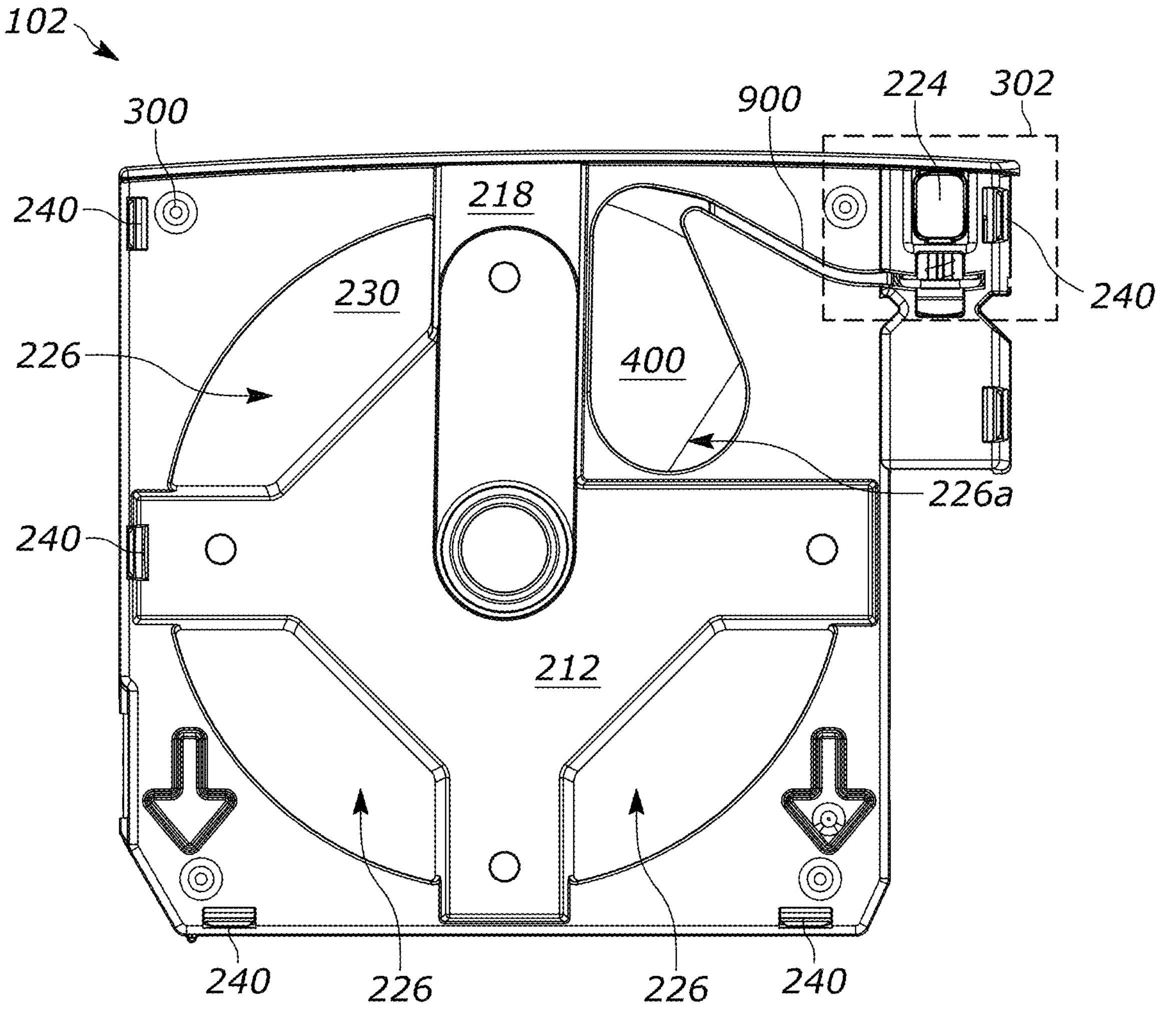

FIGS. 2 and 3A-B depict a cartridge 102 configured to be inserted into the media processing device 100 of FIG. 1. FIG. 1 is a perspective view of the cartridge 102 and FIGS. 3A-B are orthogonal profile views of opposite sides of the media cartridge 102. The cartridge 102 includes a housing 200 that is configured to contain a roll of media 230. In the depicted embodiment, the roll of media 230 is a roll of wristbands attached end-to-end (e.g., forming a web of wristbands), the wristbands can be configured to receive indicia via a thermal printhead (e.g., a thermal printhead of the media processing device 100). Alternatively, the roll of media 230 may also include a web of labels (e.g., we of media., media web, etc.), a stack of fan-fold labels, or other configuration of media that allows for modular packing of the media within the cartridge 102. The housing 200 of the cartridge 102 has a first side 202 and a second side 204 disposed opposite the first side 202. The first side 202 is a "top" of the housing 200 (in the orientation shown in FIG. 2) and is configured to receive a force from a user when installing the cartridge 102 into the media processing device 100 and the second side 204 is a "bottom" of the housing 200 of the cartridge 102 (in the orientation shown in FIG. 2). The housing of the cartridge 102 further includes a third side 206, a fourth side 208, a fifth side 210, and a sixth side 212 (visible in FIG. 3B), where the third side 206 and the fourth side 208 are opposite from each other and the fifth side 210 and the sixth side 212 are opposite from each other.

The third side 206 (also referred to herein as the "output side"), features a media output 214 from which the media 230 is arranged to exit the housing 200 of the cartridge 102. When the cartridge 102 is inserted into the media processing device 100, the media output 214 is aligned with the output 104 of the media processing device 100. In the depicted embodiment, this allows the media 230 to exit the cartridge 102 at the media output 214, pass by the print head of the media processing device 100 and out the output 104 where the user can retrieve the processed media.

FIG. 2 further depicts a spindle 216 that extends axially from the fifth side 210 towards the sixth side 212. The spindle 216 is configured such that the roll of media 230, having a roll core (see.g., roll core 620 shown in FIGS. 7A-7B) in which the media is wrapped around, is rotatably supported by the spindle 216. The spindle 216 is assembled via the combination of a first component 218 of the housing 200 and a second component 220 of the housing 200. As will be discussed further below, the housing 200 of the cartridge 102 is assembled by joining the first component 218 and the second component 220. Each of the first component 218 and the second component 220 can form a portion of the first through sixth sides of the housing 200. Alternatively, the second component 220 can form the first through fifth sides of the housing 200 and the first component 218 can form the sixth side of the housing 200 or the first component 218 can form the first through fourth and sixth sides of the housing 200 and the second component 220 can form the fifth side of the housing 200. When the first component 218 and the second component 220 are joined together, the spindle 216 is concentrically aligned within a roll of media 230 (e.g., in the cylindrical core) which allows the media 230 to be rotatably supported within the housing 200 of the cartridge 102.

In the depicted embodiment, with reference to FIGS. 2 and 3A-B, the fifth side 210 further includes a first aperture 222 and the sixth side further includes a second aperture 224 (e.g., as further shown in FIG. 3B). The first aperture 222 and the second aperture 224 are discussed in further detail below as they relate to accessing and removing internal components via the first aperture 222 and/or second aperture 224. The first aperture 222 is depicted as positioned opposite a second aperture 224. The first aperture 222 and second aperture 224 are disposed proximate to the media output 214, above a media path of the media 230 within the housing 200 (relative to the orientation of the housing illustrated in FIG. 2) and aligned with at least a portion of a media stop assembly within the housing 200.

FIGS. 2 and 3A-B further depict openings 226 in the walls of the fifth side 210 and the sixth side 212. In some embodiments, the cartridge 102 may only have openings 226 in one side of the housing 200 of the cartridge 102. The openings 226 allow the roll of media 230 to be seen without requiring opening the cartridge 102. This aids the user in quickly and easily knowing how much media is left within the cartridge 102. As will be discussed further below, the openings 226 also allows the media web of the media roll to be accessed should the media web need to be rethreaded out of the media output 214 or retracted into the cartridge 102.

As depicted in FIG. 3B, a portion of a media stop component 400 is viewable through a first opening 226*a*. The media stop component 400 is discussed and depicted in greater detail in the subsequent figures.

As depicted in FIG. 3B, the first component 218 and the second component 220 of the cartridge 102 may be guided together via alignment elements 300.

When assembling the housing, tabs 240 are secured around the perimeter of the first component 218 and the second component 220. Other embodiments for securing the housing 200 may include assembled or joined secured with tabs along the perimeter, or by using fasteners, snaps, adhesives, solvent bonding, ultrasonic welding, or using adhesive backed tape or a label. The first and second components 218 and 220 of the cartridge 102 typically need to be secured so that the cartridge 102 does not come apart due to minimum forces being applied. The roll of media 230 is positioned within the housing 200 of the cartridge 102 such that if the housing of the cartridge 102 is opened, the roll of media 230 can be damaged, become unaligned, or unusable.

According to some embodiments, the housing 200 of the cartridge 102 may be formed of a single material, such as plastic. In such examples, the plastic may be selected such that the entire housing 200 including the internal components is constructed of recyclable plastic.

Figure 4A:
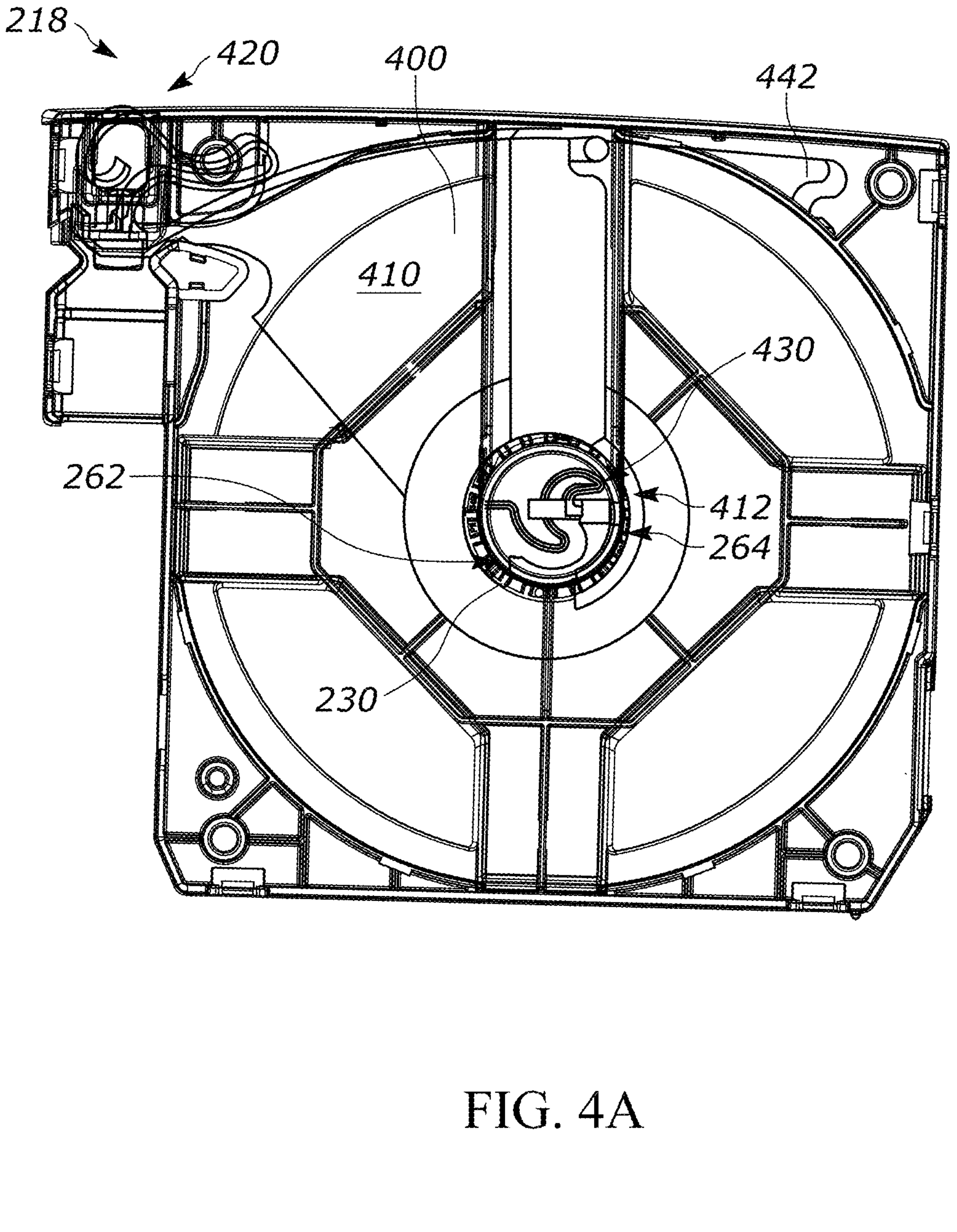
FIG. 4 illustrates a profile view of a first portion of a housing of the media cartridge of FIG. 2, including a media stop component, according to embodiments of the present disclosure.
Figure 4B:
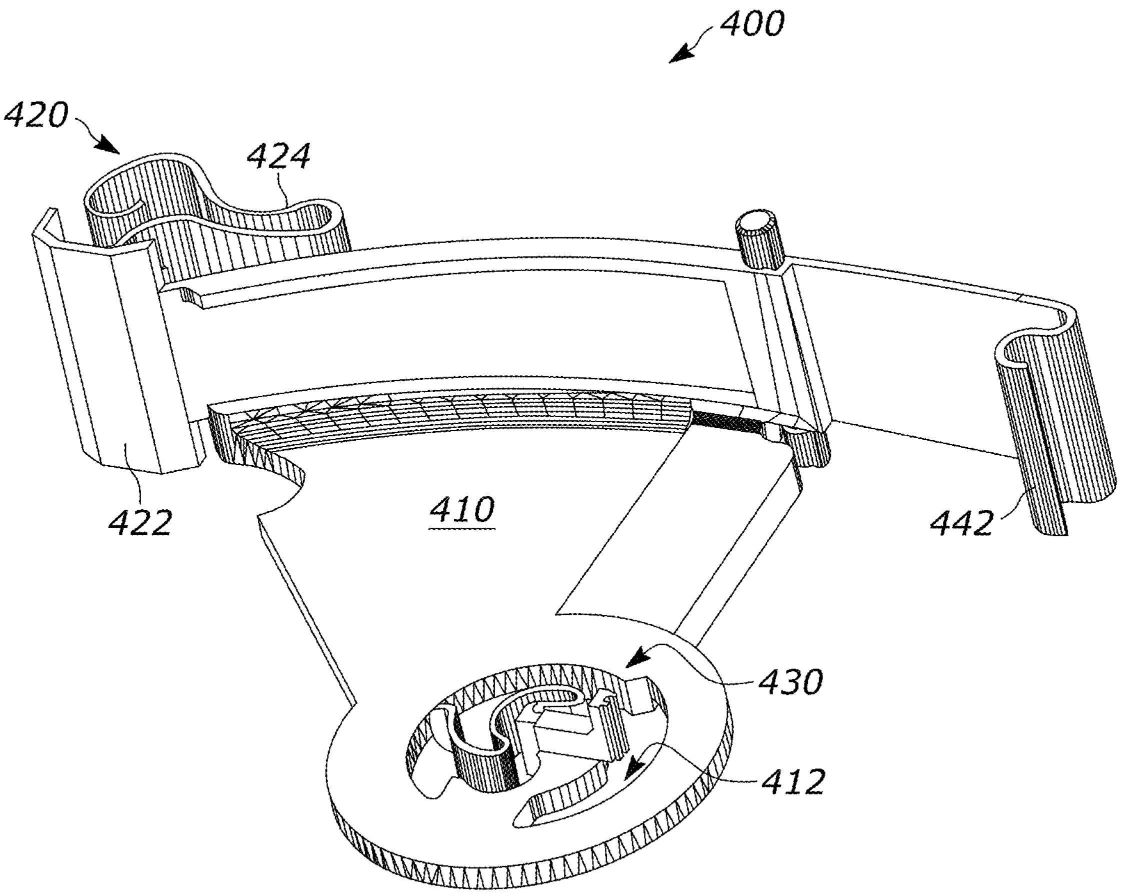

FIG. 4 illustrates an interior profile view of the first component 218 of the housing 200 (without the first component 218 and the roll of media 230), including certain internal features of the cartridge 102, according to embodiments of the present disclosure. Viewable in FIG. 4 is a media stop component 400, including the body 410, a media lock portion 420 and a roll lock portion 430. FIG. 4B illustrates a detailed perspective view of the media stop component 400, according to embodiments of the present disclosure. The media stop component 400 is generally configured to block media from being drawn from the cartridge 102 or unwinding by inhibiting rotation of a roll of media 230 about the spindle and inhibiting media from freely passing through the media output 214 when in a media hold position (see FIG. 8) and generally allow media to be drawn from the cartridge 102 by facilitating rotation of the roll of media 230 about the spindle and allowing the passage of media through the media output 214 when in a media release position (see FIG. 9).

The spindle 216 generally defines a hollow cylindrical profile in which the roll lock portion 430 of the media stop component 400 is disposed. As illustrated, the spindle 216 includes an arm slot 262 through which the roll lock portion 430 is integrally connected to the body 410 of the media stop component 400, and further includes a tooth slot 264, through which external teeth 434 of the roll lock portion 430 engage with the internal teeth 622 of the roll core (See FIGS. 6-9).

The body 410 of the media stop component 400 is generally disposed about the spindle 216 and is configured to translate from the media hold position to the media release position. As described in detail herein, various biasing members (first biasing member 424 (See FIG. 5), second biasing member 428 (See FIG. 6), third biasing member 442) bias the media stop component 400 towards the media hold position, as illustrated in FIG. 4. The third biasing member 442 extends from the body 410 of the media stop component 400 and biases the body 410 against the housing 200.

The media stop component 400 defines a gap 412 in the body 410 proximate to the spindle 216 adjacent to the tooth slot 264. The gap 412 is configured such that when the body 410 is rotated about the spindle 216, the body 410 translates such that the gap 412 is closed and an opposing gap 413 is opened (see FIG. 9). Said differently, with respect to the body 410, the spindle 416 moves into the gap 412 when the media stop component 400 is rotated.

Generally speaking, the media stop component 400 can be a single component which is integrally formed, or otherwise monolithic. As the media stop component 400 can be integrally formed, the media stop component 400 may be formed of a single material, such as a recyclable plastic (e.g., an identical type of plastic as the housing 200 or a type of plastic that can be recycled in the same manner as the type of plastic that forms the housing 22). In this manner, once the roll of media 230 is expended following a course of use of the cartridge 102, the housing 200, the media stop component 400 and the roll core 620 (e.g., remaining components) are all constructed of recyclable materials (e.g., recyclable plastics), such that the cartridge 102 may be disposed of and recycled following expenditure.

Furthermore, the integral formation of the media stop component 400 supports manufacturing processes such as injection molding and additive manufacture (e.g., 3-D printing), which may lower costs of production.

Figure 5:
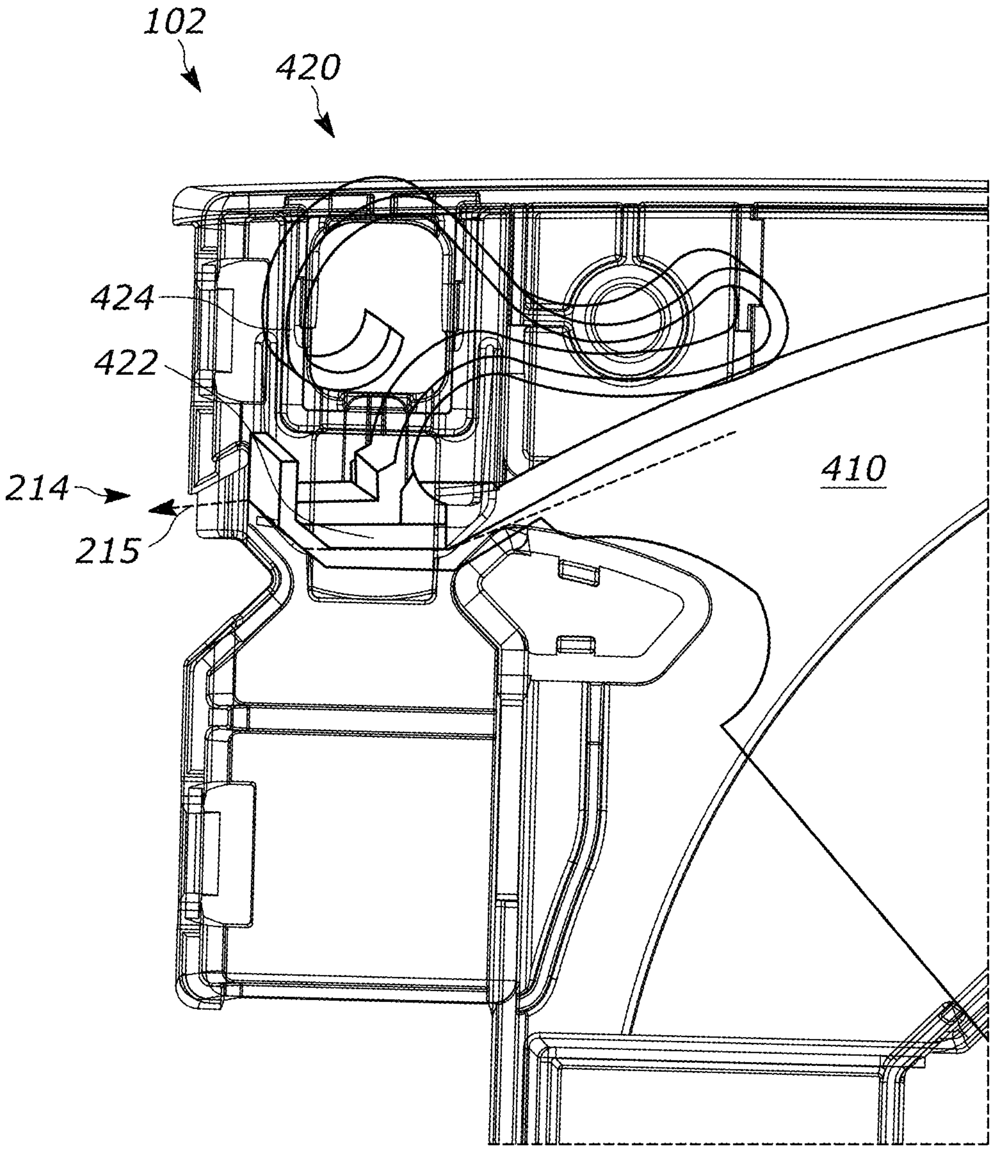
FIG. 5 illustrates a detailed view of a media stop portion of the media stop component of FIG. 4, according to embodiments of the present disclosure.

FIG. 5 illustrates the media lock portion 420 of the media stop component 400, according to embodiments of the present disclosure. Generally, the media lock portion includes a peg 422 which extends from the body 410 and a first biasing member 424 which extends from the peg 422 and biases the peg 422 against the housing 200. The cartridge 102 defines a media path 215 which extends from the roll of media 230 (not shown) to the media output 214 of the cartridge 102. Then the media stop component 400 is in the media hold position, the biasing member 424 biases the peg 422 towards the media path 215 such that the peg 422 blocks the media path 215 such that media is blocked from being drawn from the media output 214. The peg 422 may be configured to pin or pinch the media between the peg 422 and the housing 200 to inhibit the media from being drawn from the cartridge 102 when the media stop component 400 is in the media hold position.

When in the media stop component 400 is in the media release position, the peg 422, or other portion of the media stop component 400, may receive an external force which acts against the biasing force of the first biasing member 424. The external force may overcome the biasing force of the first biasing member 424, causing the first biasing member 424 to compress and the media stop component 400 to begin to rotate about the spindle 216, such that the peg 422 rotates away from the media path 215, thus unblocking the media path 215 so that the media is no longer pinned or pinched between the peg 422 and the housing 200. The external force applied to the peg 422 may be sufficient to transition the media stop component 400 from the media hold position (see FIG. 8) to the media release position (see FIG. 9).

In various embodiments, the first biasing member 424 may extend directly from the body 410 and bias the body 410 against the housing 200, such that the peg 422 is indirectly biased by the first biasing member 424. In various examples, the body 410, the peg 422 and the first biasing member 424 are integrally formed, or otherwise monolithic.

Figure 6:
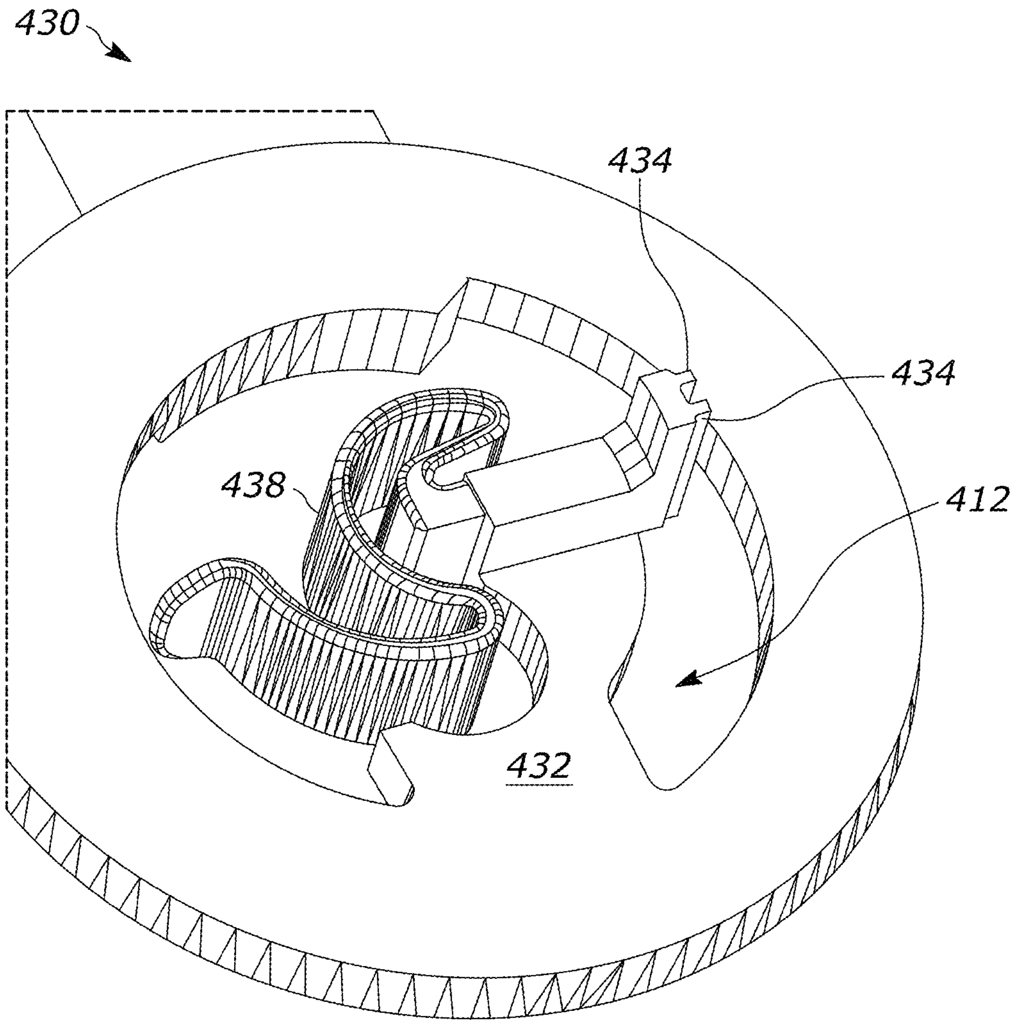
FIG. 6 illustrates a detailed view of the roll stop portion of the media stop component of FIG. 4, according to embodiments of the present disclosure.

FIG. 6 illustrates a detailed view of the roll lock portion 430 of the media stop component 400, according to embodiments of the present disclosure. The roll lock portion 430 includes an arm 432, at least an external tooth 434 (e.g., a plurality of external teeth 434, illustrated as two external teeth 434 in FIG. 6) and a second biasing member 438. The arm 432 is configured to extend through the arm slot 262 of the spindle 216. The second biasing member 238 is configured to bias the arm 232 against the hollow cylindrical profile of the spindle 216 such that the external teeth 234 extend through the tooth slot 264 of the spindle 216. The second biasing member is configured to bias the arm 232 towards the media hold position. As the arm 232 can be integrally formed with the body 410, the second biasing member 238 biases the body 410 compatibly and/or in combination with the first biasing member 424.

Figure 7A:
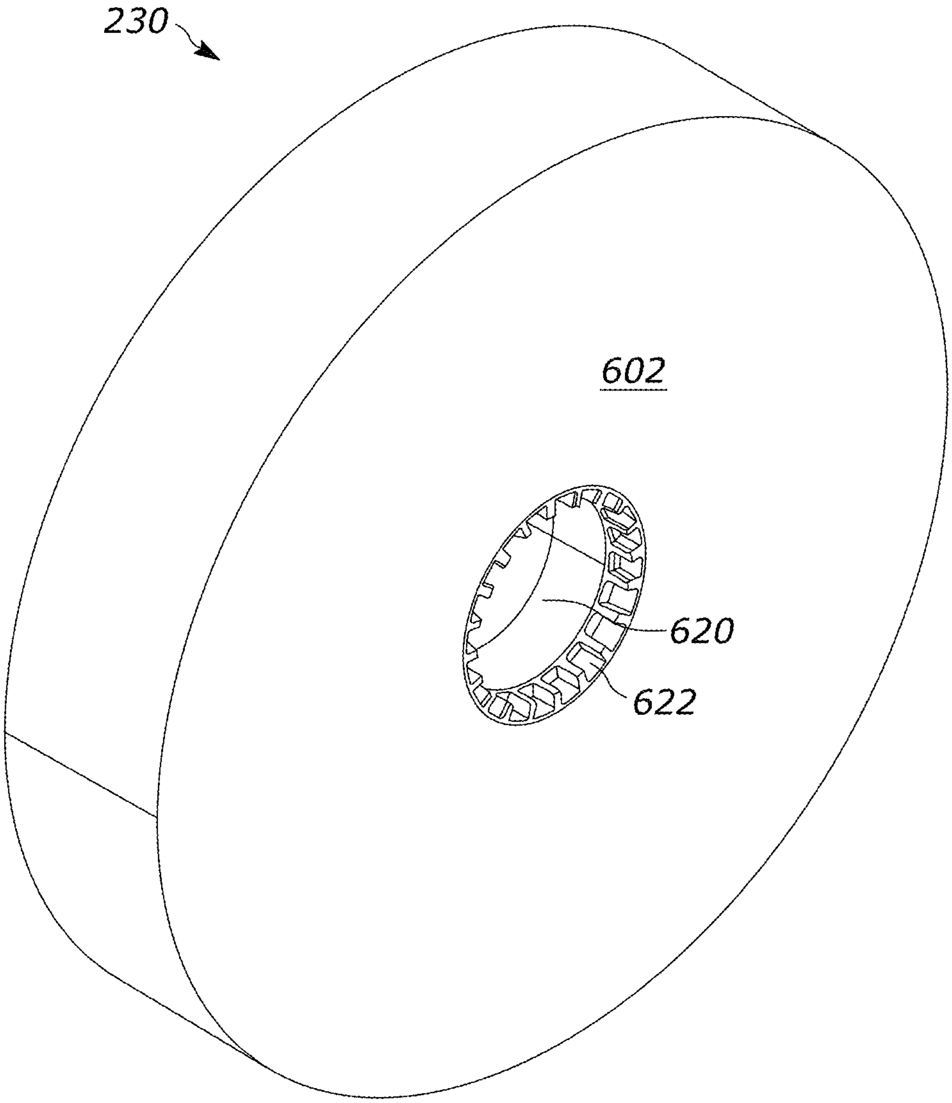
FIG. 7A illustrates a media roll according to embodiments of the present disclosure.

FIG. 7A illustrates a roll of media 230, as may be contained in and dispensed by the cartridge 102. The roll of media 230 includes a roll core 620 which defines a plurality of internal teeth 622 (generally internal teeth 622, individually internal tooth 622) about an internal circumference of the roll core 620. The roll of media 230 further includes a media web 602 wound about the roll core 620 forming the roll.

Figure 7B:
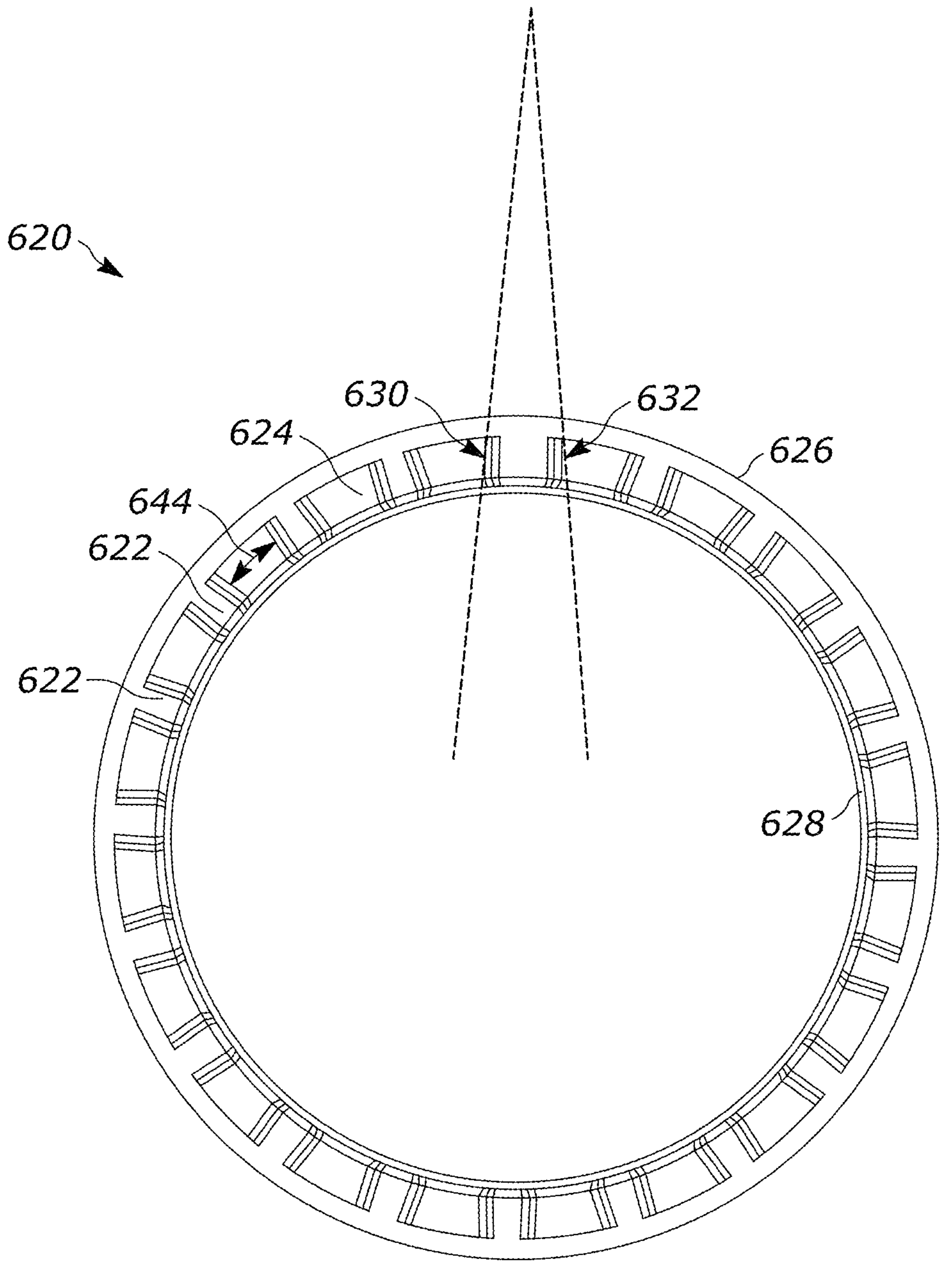
FIG. 7B illustrates a roll core of the media roll of FIG. 7A, according to embodiments of the present disclosure.

FIG. 7B illustrates a profile view of the roll core 620. The internal teeth 622 are defined about the internal surface 628 of the roll core 620. The internal teeth 622 substantially form an internal gear pattern, defined by gaps 624 between each pair of internal teeth 622. Each gap 624 has a gap width 644, which is configured such that the external tooth 404 of the arm 250 has sufficient clearance to slot into a gap 624. In some examples, the gaps 624 are configured to be wider than the external tooth 404 by at least a factor of 1.5, and at most a factor of 5.

Each internal tooth 622 includes a first tooth face 630 opposed to a second tooth face 632, and the planes in which the first tooth face 630 and the second tooth face 632 are defined are oblique with one another, and the planes intersect beyond an external surface 626 of the roll core 620. Stated differently, the first plane and the second plane intersect at a point that is located at a greater distance from a radial center of the roll core 620 than a length of a radius to the internal surface 628 of the roll core.

According to some embodiments, the roll core 620 may include more or fewer internal teeth 622 than depicted in the illustrated embodiments. Additionally, the internal teeth 622 may vary in terms of size, spacing, and angularity between embodiments.

Figure 8:
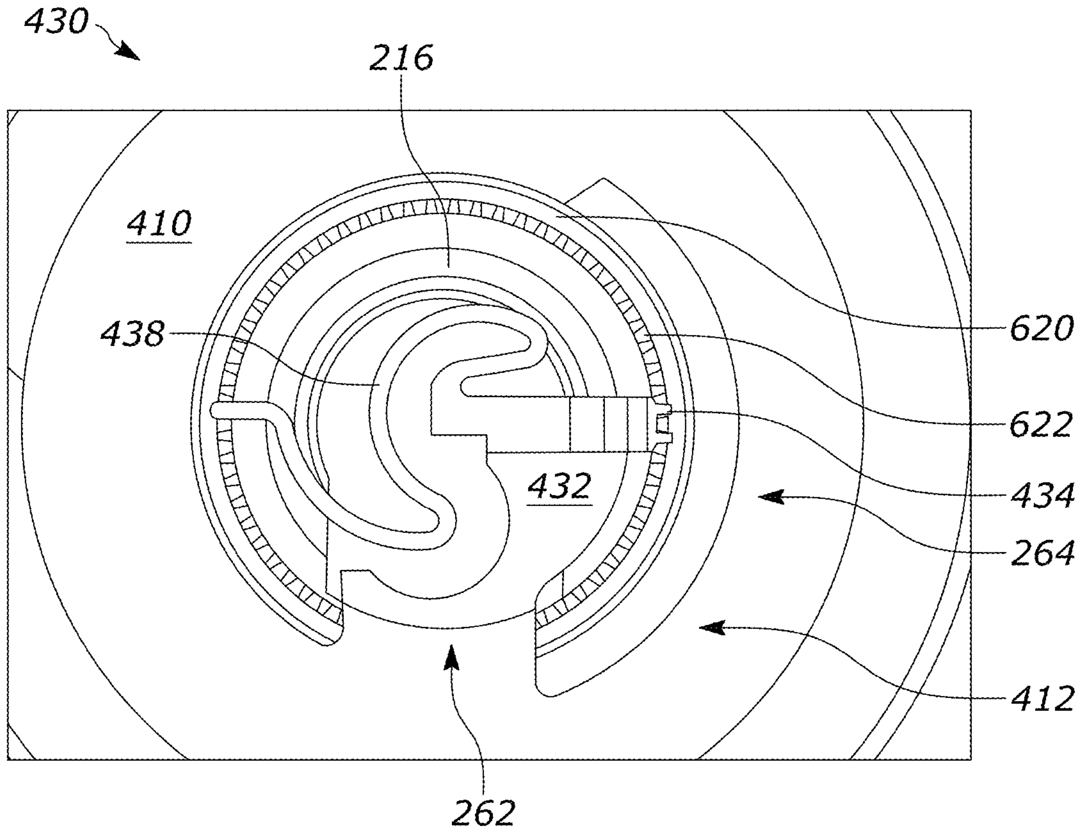
FIG. 8 illustrates a view of the roll stop portion in the media hold position, according to embodiments of the present disclosure.

FIG. 8 illustrates the roll lock portion 430 and the roll core 620 in the media hold position, according to embodiments of the present disclosure. In the media hold position, the external teeth 434 of the roll lock portion 430 extend through the tooth slot 264 and engage with the internal teeth 622 of the roll core 620, which is disposed about the spindle 216. The arm 432 is biased by the second biasing member 438 such that the external teeth 434 remain engaged with the internal teeth 622. In terms of engagement between the external teeth 434 and the internal teeth 622, the external teeth 434 slots into gaps 624 between pairs of the internal teeth 622. In some examples, the mating angle between the surfaces of the external teeth 434 and the internal teeth 622 (e.g., the external teeth 434 abutting on of the first tooth face 630 and the second tooth face 632) is oblique with respect to a radial direction of the roll core 620. The oblique mating angle is configured such that when the external teeth 434 is engaged with the internal teeth 622 and a force or torque is applied to the roll of media 230 in a manner that would be sufficient to rotate the roll of media 230 about the spindle 216 if not for the media stop component 400 being in the media hold position, that the applied force forces the external teeth 434 further into the gap 624, substantially preventing rotation of the roll and disengagement of the external teeth 434.

Figure 9:
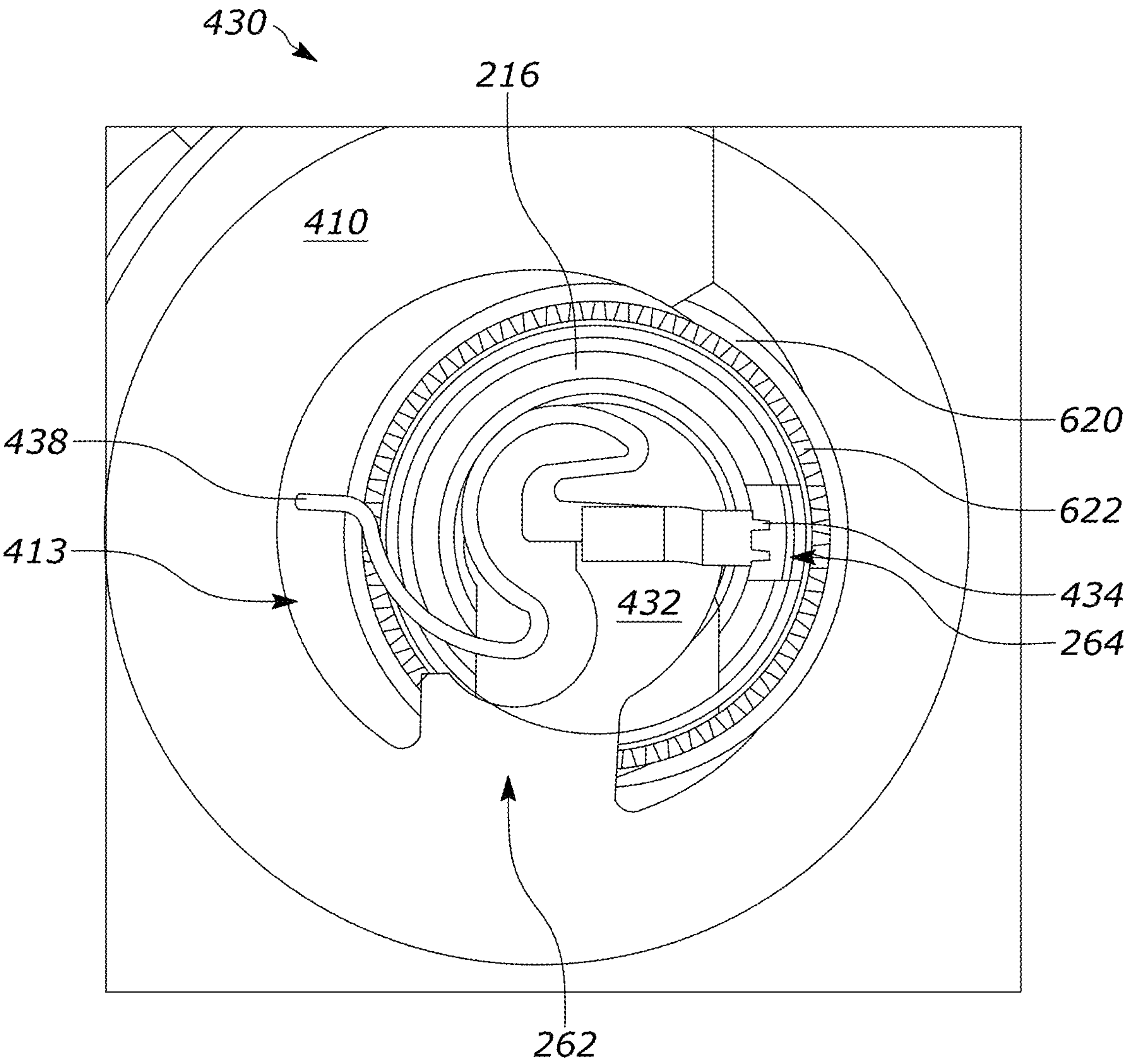
FIG. 9 illustrates a view of the roll stop portion in the media release position, according to embodiments of the present disclosure.

FIG. 9 illustrates the roll lock portion 430 and the roll core 620 in the media release position, according to embodiments of the present disclosure. When the peg 422 receives the external force which rotates the media stop component 400 by overcoming the biasing forces of the first through third biasing members 424, 438, and 442, the rotative motion causes the body 410 of the media stop component 400 to slip with respect to the spindle 216. When the media stop component 400 is rotated and subsequently slips, the body 410 slips such that the spindle 216 “moves” into the gap 412 (e.g., moves relative to the media stop component 400, the spindle 216 is fixed relative to the housing 200) and “opens” the opposing gap 413. This translation acts counter to the biasing force of the second biasing member 438, such that the second biasing member 438 is compressed responsive to the rotation and subsequent translation of the media stop component 400, which is in turn responsive to the external force received by the peg 422. When the media stop component 400 is rotated and slips, the external teeth 434 are retracted into the spindle 416 (e.g., out of the tooth slot 264) and subsequently disengage from the internal teeth 622 of the roll core 620. Said differently, the arm 432 moves away from the plurality of internal teeth 622 of the roll core 620 to space the external tooth 434 away from the plurality of internal teeth 622, and the roll of media 230 is rotatable about the spindle 216. Once the external teeth 434 and the internal teeth 622 are disengaged from one another, the roll core 620, and by extension the roll of media 230 (not shown) are rotatable about the spindle 216. In conjunction with the media path 215 being unblocked as a result of the external force, media may be drawn from the cartridge 102 relatively unhindered. The roll of media 230 may rotate about the spindle 216 as the media is drawn from the media output 214 when the media stop component 400 is in the media release position.

The media stop component 400 may be transitioned from the media hold position to the media release position by the media processing device 100. When the cartridge 102 is inserted into place in the media processing device 100, the peg 422 is aligned with a printer feature which is configured to apply the external force to the peg 422, such that the media stop component 400 is rotated against the bias of the first biasing member 424, second biasing member 438 and the third biasing member 442. The printer feature may be fixed such that when the cartridge 102 is installed in the printer, the media stop component 400 is secured in the media release position.

In some embodiments the body 410 includes a protrusion which is accessible to a user through an opening 226 of the cartridge 102. The protrusion may configured such that a user may apply a force to the protrusion which results in a torque applied to the body 410 which is sufficient to overcome the biasing torque of the first biasing member 424, second biasing member 438 and the third biasing member 442 such that the media stop component 400 is transitioned to the media release position.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms “comprises,” “comprising,” “has”, “having,” “includes”, “including,” “contains”, “containing” or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by “comprises . . . a”, “has . . . a”, “includes . . . a”, “contains . . . a” does not, without more constraints, preclude the existence of additional identical elements in the process, method, article, or apparatus that comprises, has, includes, contains the element. The terms “a” and “an” are defined as one or more unless explicitly stated otherwise herein. The terms “substantially”, “essentially”, “approximately”, “about” or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term “coupled” as used herein is defined as connected, although not necessarily directly and not necessarily mechanically. A device or structure that is “configured” in a certain way is configured in at least that way, but may also be configured in ways that are not listed.

Certain expressions may be employed herein to list combinations of elements. Examples of such expressions include: “at least one of A, B, and C”; “one or more of A, B, and C”; “at least one of A, B, or C”; “one or more of A, B, or C”. Unless expressly indicated otherwise, the above expressions encompass any combination of A and/or B and/or C.

It will be appreciated that some embodiments may be comprised of one or more specialized processors (or “processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media cartridge comprising:

a housing, comprising a spindle having a hollow cylindrical profile and a slot;

a media roll configured to rotate about the spindle, the media roll comprising:

a roll core, the roll core configured to rotate about the spindle, the roll core comprising a plurality of internal teeth disposed about an internal circumference of the roll core, and a web of media, wound about the roll core;

a media stop component, configured to rotate between a media hold position and a media release position, comprising:

a body, a peg extending from the body, a first biasing member configured to bias the peg towards a surface of the housing, an arm extending from the body, the arm configured to extend through the slot of the spindle and into the hollow cylindrical profile, the arm comprising at least an external tooth, and a second biasing member configured to bias the arm such that the external tooth engages with the plurality of internal teeth of the roll core, wherein, when the media stop component is in the media hold position, a) the web of media is pinched between the peg and the surface of the housing, and b) the external tooth is engaged with at least one of the plurality of internal teeth of the roll core, such that rotation of the media roll about the spindle is blocked, and wherein when the media stop component is in the media release position, a) the body is configured to rotate against a bias of the first biasing member, such that the peg is separated from the surface of the housing and the web of media is translatable between the peg and the surface of the housing, and b) the body is configured to rotate against a bias of the second biasing member, such that the arm rotates away from the plurality of internal teeth of the roll core to space the external tooth away from the plurality of internal teeth, and the media roll is rotatable about the spindle, wherein media stop component is integrally formed.

2. The media cartridge of claim 1, further comprising a third biasing member, integrally formed with the body, the third biasing member configured to bias the body towards the media hold position.

3. The media cartridge of claim 1, wherein the media stop component rotates about the spindle.

4. The media cartridge of claim 1, wherein the second biasing member biases the arm against a surface of the hollow cylindrical profile of the spindle.

5. The media cartridge of claim 1, wherein the media stop component is configured to be rotated from the media hold position to the media release position in response to an external force applied to the peg.

6. The media cartridge of claim 1, wherein the web of media is comprised of media elements selected from a group consisting of labels, wristbands, RFID tags, printable media, and combinations thereof.

7. The media cartridge of claim 1, wherein a mating angle between one of the plurality of internal teeth and the external tooth is configured such that when a rotative force is applied to the media roll when the media stop component is in the media hold position, the external tooth is biased towards the roll core.

8. The media cartridge of claim 7, each internal tooth of the plurality of internal teeth includes a first tooth face opposed to a second tooth face, the first tooth face defined in a first plane and the second tooth face defined in a second plane, such that the first plane and the second plane intersect at a point that is located at a greater distance from a radial center of the roll core than an internal circumference of the roll core.

9. The media cartridge of claim 1, wherein the plurality of internal teeth is configured such that a gap width of a gap between each pair of teeth of the plurality of internal teeth is at least 1.5 times a tooth width of the external tooth.

10. The media cartridge of claim 1, wherein the arm includes a plurality of external teeth, each external tooth of the plurality of external teeth configured to engage with the plurality of internal teeth of the roll core when the media stop component is in the media hold position.

11. The media cartridge of claim 1, wherein the housing is formed by a first housing side and a second housing side, and the spindle is formed by a first spindle portion, integrally formed with the first housing side and a second spindle portion integrally formed with the second housing side, the slot formed in one of the first spindle portion and the second spindle portion.

12. The media cartridge of claim 1, wherein the media stop component is an injection molded plastic element.

13. The media cartridge of claim 1, wherein the media stop component is an additively manufactured plastic element.

14. A media cartridge comprising:

a housing, comprising a spindle having a hollow cylindrical profile and a slot;

a media stop component, configured to rotate between a media hold position and a media release position, comprising:

a body, a peg extending from the body, a first biasing member configured to bias the peg towards a surface of the housing;

an arm extending from the body, the arm configured to extend through the slot of the spindle and into the hollow cylindrical profile, the arm comprising at least an external tooth; and a second biasing member configured to bias the arm towards the slot; and wherein, when the media stop component is in the media hold position, a) the peg is pressed against the surface of the housing; and b) the external tooth extends from the spindle through the slot;

wherein when the media stop component is in the media release position, a) the body is configured to rotate against a bias of the first biasing member, such that the peg is separated from the surface of the housing, and b) the body is configured to rotate against a bias of the second biasing member, such that the arm translates away from the slot and the external tooth is retracted into the spindle away from the slot, wherein media stop component is integrally formed.

15. The media cartridge of claim 14, further comprising:

a media roll comprising:

a roll core, the roll core configured to rotate about the spindle, comprising a plurality of internal teeth disposed about an internal circumference of the roll core;

a web of media, wound about the roll core; and wherein when in the media hold position, the external tooth of the arm engages with the plurality of internal teeth of the roll core, blocking the media roll from rotating about the spindle;

wherein, when in the media release position, the external tooth is disengaged from the plurality of internal teeth, such that the media roll is rotatable about the spindle.

16. The media cartridge of claim 14, wherein the media stop component is an injection molded plastic element.

17. The media cartridge of claim 14, wherein the media stop component is an additively manufactured plastic element.

* * * * *